(12) United States Patent
Kumar et al.

(10) Patent No.: US 8,757,471 B2
(45) Date of Patent: Jun. 24, 2014

(54) ACTIVE BRAZE TECHNIQUES ON BETA-ALUMINA

(75) Inventors: Sundeep Kumar, Bangalore (IN); Mohandas Nayak, Bangalore (IN); Mohamed Rahmane, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/595,541

(22) Filed: Aug. 27, 2012

(65) Prior Publication Data
US 2014/0110460 A1 Apr. 24, 2014

(51) Int. Cl.
*B23K 31/02* (2006.01)

(52) U.S. Cl.
USPC .............. 228/121; 228/122.1; 228/124.5; 228/233.2

(58) Field of Classification Search
None
See application file for complete search history.

(56) References Cited

U.S. PATENT DOCUMENTS

| | | | | |
|---|---|---|---|---|
| 3,316,129 A * | 4/1967 | Token et al. | | 148/607 |
| 3,928,071 A * | 12/1975 | Thornton | | 429/171 |
| 4,048,393 A | 9/1977 | Heintz et al. | | |
| 4,193,954 A * | 3/1980 | Speronello | | 264/13 |
| 4,238,553 A * | 12/1980 | Weddigen et al. | | 429/104 |
| 4,401,731 A * | 8/1983 | Steinleitner | | 429/104 |
| 4,413,043 A * | 11/1983 | Steinleitner et al. | | 429/104 |
| 4,447,391 A * | 5/1984 | Mizuhara | | 420/456 |
| 4,510,217 A * | 4/1985 | Kagawa et al. | | 429/104 |
| 4,795,686 A * | 1/1989 | Yokoi et al. | | 429/104 |
| 4,868,072 A * | 9/1989 | Abbin et al. | | 429/11 |
| 5,013,612 A | 5/1991 | Hunt et al. | | |
| 5,042,847 A * | 8/1991 | Lasecki et al. | | 285/331 |
| 5,196,277 A * | 3/1993 | Mima et al. | | 429/104 |
| 5,547,121 A * | 8/1996 | Kapoor et al. | | 228/121 |
| 5,955,686 A | 9/1999 | Sakuraba et al. | | |
| 6,149,051 A * | 11/2000 | Vollmer et al. | | 228/262.72 |
| 6,770,377 B2 | 8/2004 | Hegner et al. | | |
| 7,696,455 B2 | 4/2010 | Lin et al. | | |
| 2006/0124706 A1* | 6/2006 | Raybould et al. | | 228/262.72 |
| 2012/0141879 A1* | 6/2012 | Chung | | 429/305 |
| 2012/0308839 A1* | 12/2012 | Chaumat et al. | | 428/450 |

FOREIGN PATENT DOCUMENTS

| | | | |
|---|---|---|---|
| JP | 09-115544 A | * | 5/1997 |
| JP | 09-326261 A | * | 12/1997 |
| WO | 9966569 | | 12/1999 |

OTHER PUBLICATIONS

K. Mohammed Jasim, et al; "Actively brazed alumina to alumina joints using CuTi, CuZr and eutectic AgCuTi filler alloys," Ceramics International, Aug. 4, 2010, pp. 2287-2295, vol. 36, Issue 8.

S. Ghosh, et al.; "Characterization of alumina-alumina/graphite/monel superalloy brazed joints," Ceramics International, Jul. 30, 2011, pp. 663-670, vol. 38.

C.A. Walker, et al; "Comparing Metal-Ceramic Brazing Methods," Brazing and Soldering Today, Oct. 2008, pp. 43-50.

Cord-H Dustmann; "Advances in ZEBRA Batteries," Journal of Power Sources, 2004, vol. 127, pp. 85-92.

Mizuhura, et al; "High-Reliability Joining of Ceramic to Metal," Ceramic Bulletin, vol. 68, No. 9, 1989, pp. 1591-1599.

* cited by examiner

*Primary Examiner* — Kiley Stoner
(74) *Attorney, Agent, or Firm* — Francis T. Coppa (57) ABSTRACT

The present disclosure generally relates to methods of using active braze techniques on beta-alumina. In some specific embodiments, the present disclosure relates to a method of sealing a portion of beta-alumina electrolyte, insulated collar and metal rings of a sodium-based thermal battery.

19 Claims, 3 Drawing Sheets

ACTIVE BRAZE TECHNIQUES ON BETA-ALUMINA

TECHNICAL FIELD

The present disclosure generally relates to methods of using active braze techniques in high temperature rechargeable batteries. In some specific embodiments, the present disclosure relates to a method of sealing a portion of beta-alumina electrolyte to an insulated collar and metal rings of a sodium metal halide battery.

BACKGROUND

High-temperature rechargeable batteries, such as sodium-based thermal batteries like sodium metal halide or sodium sulfur cells, have a number of components that need to be sealed for the cell to work. Sodium metal halide batteries, for instance, include a sodium metal anode and a metal halide ($NiCl_2$ for example) cathode. Beta"-alumina solid electrolyte (BASE) separator is used to separate the anode and cathode. The solid electrolyte allows the transport of sodium ions between anode and cathode. A secondary electrolyte ($NaAlCl_4$) is also used in the cathode mixture. The cathode mixture consists of nickel and sodium chloride along with other additives. The cathode mixture is contained inside the BASE tube, which is closed on one end.

The present design of Na—$NiCl_2$ battery cell entails having the open end of this beta-alumina ceramic tube joined to an alpha-alumina collar using a glass seal. Spinel, zirconia, yttria, or other ceramic insulators, or combinations thereof, may also be used as a collar material in Na—$NiCl_2$ batteries. The collar is in turn joined with nickel rings with the help of thermal compression bonding (TCB). TCB is achieved through metallizing the collar. The design of the present cell demands this seal to be resistant towards molten sodium and molten halide (sodium melts at 98° C. and $NaAlCl_4$ melts at 157° C.). The glass seal and TCB are two of the weak links in the present design for a path to long life: the glass seal and TCB encounter corrosion from sodium and halide and, because of this, are found to degrade over time.

There are two ways to address this problem; one is by improving the glass seal and TCB in terms of degradation from sodium and halide corrosion; and second is by completely eliminating the glass seal and TCB in the design of the cell. The use of this glass seal can be eliminated by using a graded ceramic (beta-alumina tube with alpha-alumina header) tube. However, in the design where this graded tube is used, the nickel ring cannot be joined with the alpha-alumina collar using a TCB-like process. Therefore, alternate joining technologies are necessary.

Active brazing is a procedure in which one of the components from a braze alloy reacts with ceramic and forms an interfacial bond. The requirement of a braze alloy for use in high temperature rechargeable batteries is high corrosion resistance towards sodium and halide. Conventionally, brazing is done through metallization in combination with a braze alloy. However, metallization (for example with Mo) is typically carried out at a temperature ~1550° C., a temperature too high for beta-alumina, as it starts losing soda ($Na_2O$). Therefore, metallization is not an appropriate procedure for the beta-alumina tube found in these cells. Further, the metallization/TCB process is complicated and expensive. Active brazing has been known in the literature to join ceramic to metal, but there are not many active braze alloys (ABAs), particularly high temperature (900-1200° C.) ABAs and resistant to corrosion from sodium and halide available commercially.

There continues to be a growing need in the art for high performance metal halide batteries with lower fabrication costs. Prior attempts for achieving this have utilized reticulated carbon foams and meshes. However, these materials frequently do not allow for even distribution across the cathode. Additionally, they are often more expensive than the nickel they are trying to replace. The methods of introducing these materials to the cathode can be quite arduous and difficult to put into commercial large scale operation. Thus, it may be desirable to have an electrode material that maintains the performance of the battery, but allows for a reduction in costs over those materials currently available.

BRIEF DESCRIPTION

The present disclosure provides, in a first aspect, a method of sealing a portion of beta-alumina electrolyte, insulated collar and metal rings of a sodium-based thermal battery, such as a sodium metal halide battery. This method includes introducing a braze alloy composition between a beta-alumina component and a ceramic insulator component to be joined, and introducing a braze alloy composition between the ceramic insulator component and a metal or metal alloy component to be joined. The components are then heated to form an active braze seal (joint) between the beta-alumina component and the ceramic insulator component and between the ceramic insulator component and the metal or metal alloy component. In some embodiments, the braze alloy composition comprises nickel and an active metal element, and further comprises a) germanium, b) niobium and chromium, or c) silicon and boron. Alternatively, the braze alloy composition may comprise copper, nickel and an active metal element.

The present disclosure provides, in a second aspect, a method of joining a ceramic insulator and beta-alumina by active brazing. This method includes introducing a braze alloy composition between the ceramic insulator and the beta-alumina to be joined; and heating the components to form an active braze seal (joint) between the ceramic insulator and the beta-alumina. In this embodiment, the braze alloy composition comprises nickel and an active metal element, and further comprises a) germanium, b) niobium and chromium, or c) silicon and boron. Alternatively, the braze alloy composition comprises copper, nickel and an active metal element.

These and other objects, features and advantages of this disclosure will become apparent from the following detailed description of the various aspects of the disclosure taken in conjunction with the accompanying drawings.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The disclosure includes embodiments related to methods of sealing portions of an electrochemical cell, for example a metal halide battery such as a sodium-based thermal battery, for instance, a sodium/sulfur or a sodium metal halide battery, by utilizing a braze alloy composition. As discussed in detail below, some of the embodiments of the present invention provide a method for joining a ceramic insulator to beta-alumina by utilizing a braze alloy composition. Other embodiments relate to methods of sealing a portion of beta-alumina electrolyte, insulated collar and metal rings of a sodium-based thermal battery, such as a sodium metal halide battery. In these embodiments, a braze alloy composition is introduced between a first component comprised of beta-alumina and a second component comprised of a ceramic insulator to be joined. A braze alloy composition is then introduced between the second component and a third component comprised of metal or metal alloy to be joined. The components are then heated to form an active braze seal (joint) between the first component and the second component and between the second component and the third component.

In one particular embodiment, the same braze alloy composition can be used to join all components in the same heating cycle. By decreasing the need for metallization and TCE, as well as glass seals, these embodiments allow for fewer steps to be undertaken, decreasing the cost of the fabrication of the battery. Though the present discussion provides examples in the context of a sodium-based thermal battery, such as a metal halide battery, these processes can be applied to many other applications which utilize ceramic joining.

The use of active brazing in embodiments of this disclosure has a number of benefits. First, active brazing eliminates the weak links such as glass seals and TCB in the battery. Second, it potentially reduces the number of steps necessary and the high temperature processing involved with metallization. Third, active brazing has the promise of long life and, thus, high reliability. Finally, active brazing is very cost effective. In short, active brazing decreases the number of process steps and increases reliability and performance of the cell. While some uses of active brazing are known in the literature, there are not many high temperature active braze alloys available commercially. Alloys suitable for use in high temperature rechargeable batteries need to be compatible with the battery chemistry and should be able to be brazed below 1250° C.

Typically, "brazing" uses a braze material (usually an alloy) having a lower liquidus temperature than the melting points of the components (i.e. their materials) to be joined. The braze material is brought to or slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy for a particular application should withstand the service conditions required and melt at a lower temperature than the base materials or melt at a very specific temperature. Conventional braze alloys usually do not wet ceramic surfaces sufficiently to form a strong bond at the interface of a joint. In addition, the alloys may be prone to sodium and halide corrosion.

As used herein, the term "brazing temperature" refers to a temperature to which a brazing structure is heated to enable a braze alloy to wet the components to be joined, and to form a braze joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments of the present invention provide a braze alloy composition capable of forming a joint by "active brazing" (described below). In some specific embodiments, the composition also has high resistance to sodium and halide corrosion. In some embodiments, the braze alloy composition includes nickel and an active metal element, and further comprises a) germanium, b) niobium and chromium or c) silicon and boron. Alternatively, the braze alloy composition comprises copper, nickel and an active metal element, as described herein. Each of the elements of the alloy contributes to at least one property of the overall braze composition, such as liquidus temperature, coefficient of thermal expansion, flowability or wettability of the braze alloy with a ceramic, and corrosion resistance. Some of the properties are described below.

"Active brazing" is a brazing approach often used to join a ceramic to a metal or a metal alloy, or a ceramic to a ceramic. Active brazing uses an active metal element that promotes wetting of a ceramic surface, enhancing the capability of providing a hermetic seal. An "active metal element", as used herein, refers to a reactive metal that has higher affinity to the oxygen compared to the affinity of element in ceramic and thereby reacts with the ceramic. A braze alloy composition containing an active metal element can also be referred to as an "active braze alloy." The active metal element undergoes a decomposition reaction with the ceramic, when the braze alloy is in molten state, and leads to the formation of a thin reaction layer on the interface of the ceramic and the braze alloy. The thin reaction layer allows the braze alloy to wet the ceramic surface, resulting in the formation of a ceramic-ceramic or a ceramic-metal, joint/bond, which may also be referred to as "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina or beta-alumina) to form a uniform and continuous reaction layer, and the capability of the active metal element of forming an alloy with a base alloy (e.g. Ni—Ge alloy). An 'active' element will react with the ceramic, forming a reaction layer between the ceramic and the molten braze that will reduce the interfacial energy to such a level that wetting of the ceramic takes place. The active metal element for embodiments herein is often titanium. Other suitable examples of the active metal element include, but are not limited to, zirconium, hafnium, and vanadium. A combination of two or more active metal elements may also be used. In some specific embodiments, the braze alloy includes titanium.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, less than about 10 microns. A high amount of the active metal layer may cause or accelerate halide corrosion.

For the purpose of this disclosure, a "base metal" refers to the metal which has the highest weight percent in the alloy. In some embodiments, the base metal is nickel. In other embodiments, the base metal is copper.

The braze alloy composition may further include at least one alloying element. The alloying element may provide further adjustments in several required properties of the braze alloy, for example coefficient of thermal expansion, liquidus temperature and brazing temperature. In one embodiment, the alloying element can include, but is not limited to, cobalt, iron, chromium, niobium or a combination thereof.

As used herein, the term "liquidus temperature" generally refers to a temperature at which an alloy is transformed from a solid into a molten or viscous state. The liquidus temperature specifies the maximum temperature at which crystals can co-exist with the melt in thermodynamic equilibrium. Above the liquidus temperature, the alloy is homogeneous, and below the liquidus temperature, more and more crystals begin to form in the melt with time, depending on the alloy. Generally, an alloy, at its liquidus temperature, melts and forms a seal between two components to be joined.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint between the other structures. The seal structure may also be referred to as a "seal."

A "ceramic insulator" is defined as any compound or composition which is an electronic and ionic insulator. For purposes of this disclosure, a ceramic insulator must also be compatible with the chemical and temperature requirements of the battery atmosphere. In some embodiments, the ceramic insulator may comprise alpha-alumina, spinel, zirconia, or yttria, or combinations thereof. In some embodiments, the ceramic insulator is alpha-alumina.

For purposes of this disclosure, "beta-alumina" refers to a ceramic in which the major portion is comprised of β"-alumina (beta-prime-prime alumina), even if some β'-alumina is present. In many embodiments of the invention, β"-alumina is the preferred form.

Figure 1:
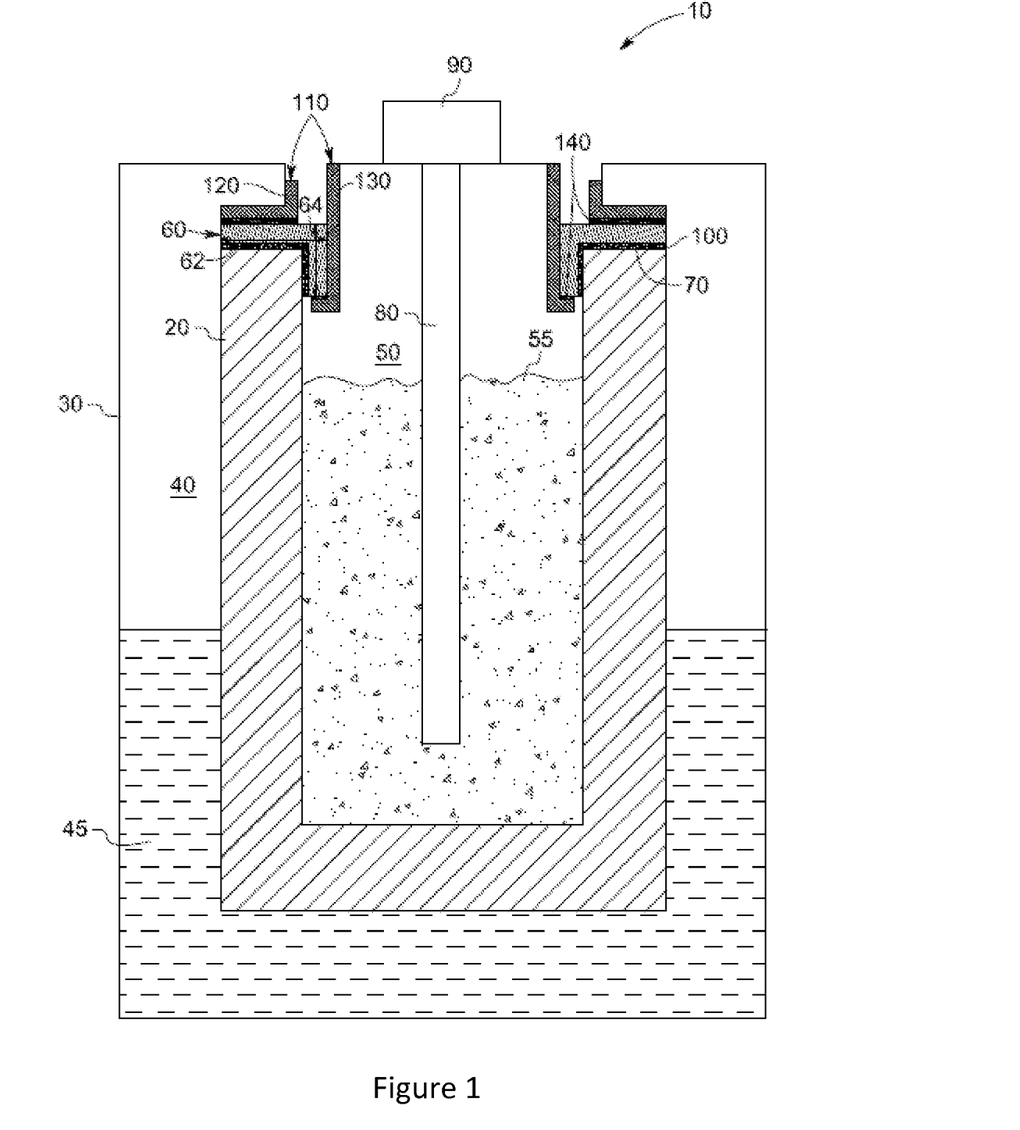
FIG. 1 is a schematic view showing a cross-section of an electrochemical cell, according to an embodiment.

FIG. 1 is a schematic diagram depicting an exemplary embodiment of a sodium-metal halide battery cell 10. The cell 10 has an ion-conductive separator tube 20 disposed in a cell case 30. The separator tube 20 is usually made of β"-alumina. The tube 20 defines an anodic chamber 40 between the cell case 30 and the tube 20, and a cathodic chamber 50, inside the tube 30. The anodic chamber 40 is usually filled with an anodic material 45, e.g. sodium. The cathodic chamber 50 contains a cathode material 55 (e.g. nickel and sodium chloride), and a molten electrolyte, usually sodium chloroaluminate ($NaAlCl_4$) along with some other additives.

An electrically insulating collar 60, which may be made of alpha-alumina, zirconia, spinel, yttria, or other ceramic insulator, or combinations thereof, is situated at a top end 70 of the tube 20. A cathode current collector assembly 80 is disposed in the cathode chamber 50, with a cap structure 90, in the top region of the cell. The collar 60 is fitted onto the top end 70 of the separator tube 20, and is sealed by a glass seal 100 in existing battery design. In one embodiment, the collar 60 includes an upper portion 62, and a lower inner portion 64 that abuts against an inner wall of the tube 20, as illustrated in FIG. 1.

In order to seal the cell 10 at the top end (i.e., its upper region), and to ensure anode and cathode are chemically and physically separate from each other, the collar 60 in the corrosive environment, a ring 110 made of metal or a metal alloy is disposed, covering the collar 60, and joining the collar with the current collector assembly 80, at the cap structure 90. The ring 110 has two portions; an outer ring 120 and an inner ring 130, which are joined, respectively, with the upper portion 62 and the lower portion 64 of the collar 60, by means of the active braze seal 140. The active braze seal 140 is provided by the braze alloy composition described above. The collar 60 and the ring 110 may be temporarily held together with an assembly (e.g., a clamp) or by other techniques, if necessary, until sealing is complete.

The outer ring 120 and the inner ring 130 are usually welded shut to seal the cell, after joining with the collar 60 is completed. The outer ring 120 can be welded to the cell case 30; and the inner ring 130 can be welded to the current collector assembly 80.

The shapes and size of the several components discussed above with reference to FIG. 1 are only illustrative for the understanding of the cell structure; and are not meant to limit the scope of the invention. The exact position of the seals and the joined components can vary to some degree. Moreover, each of the terms "collar" and "ring" is meant to comprise metal or ceramic parts of circular or polygonal shape, and in general, all shapes that are compatible with a particular cell design.

Embodiments of the disclosure provide a method for joining two or more components by using a braze alloy composition. The method includes steps of introducing the braze alloy between two components to form a brazing structure. The alloy may be introduced on either or both of the mating surfaces of the components. The brazing structure can then be heated to form an active braze seal between the two components. In one embodiment, the first component includes beta-alumina and the second component includes alpha-alumina, spinel, zirconia, or yttria, or combinations thereof. In another embodiment, the first component includes beta-alumina and the second component includes alpha-alumina.

One embodiment of the disclosure relates to a method of joining beta-alumina to a ceramic insulator with a braze alloy composition. In some embodiments, the beta-alumina component is joined with the ceramic insulator component using an active braze foil (or paste). Referring to FIG. 1, the beta-alumina component can be the top (open) end 70 of a beta-alumina tube 20. The ceramic insulator component can be a collar 60. In these embodiments, the braze alloy composition comprises nickel and an active metal element, and further comprises a) germanium, b) niobium and chromium, or c) silicon and boron. Alternatively, the braze alloy composition comprises copper, nickel and an active metal element. The braze alloy composition is introduced between the beta-alumina component (70) and the ceramic insulator component (60) to be joined. The components with the braze alloy composition are then heated to form an active braze seal between the two components. In one embodiment, the ceramic insulator component comprises alpha-alumina, spinel, zirconia, or yttria, or combinations thereof. In another embodiment, the ceramic insulator component comprises alpha-alumina.

The current design of Na—NiCl$_2$ batteries uses a glass seal 100 for the purpose of joining a beta-alumina component 70 with an alpha-alumina component 60. However, glass seals suffer from corrosion from sodium/halide and subsequent degradation. Additionally, current Na—NiCl$_2$ battery design employs metallization/TCB to join alpha-alumina collars 60 to nickel rings 110. Braze alloys, unlike glass seals, can be designed and tuned to have minimal (or no) corrosion. This disclosure removes the necessity of the glass seal and the metallization/TCB process by utilizing brazing. The advantage of this approach is that all of the joining processes—beta-alumina 70 to ceramic insulator collar (e.g., alpha-alumina) 60 and ceramic insulator collar (e.g., alpha-alumina) 60 to nickel rings 110—can be carried out in a single step. The cost is thereby reduced because the number of steps is minimized.

One embodiment of the disclosure, therefore, relates to a method of sealing a portion of beta-alumina electrolyte, insulated collar and metal (or metal alloy) rings of a sodium-based thermal battery, such as a sodium metal halide battery. In this embodiment, a braze alloy composition is introduced between a first component comprised of beta-alumina 70 and a second component comprised of a ceramic insulator 60. The second component may be, in some instances, comprised of alpha-alumina, spinel, zirconia, yttria, or combinations thereof. In some instances, the ceramic insulator 60 is comprised of alpha-alumina. The braze alloy composition is also introduced between the second component 60 and a third component comprised of metal or a metal alloy 110. In some embodiments, the third component comprises nickel or a nickel based alloy. In some of these embodiments, the braze alloy composition comprises nickel and an active metal element, and further comprises a) germanium, b) niobium and chromium, or c) silicon and boron. Alternatively, the braze alloy composition may comprise copper, nickel and an active metal element. All three components are then heated to form active braze seals between the first component 70 and the second component 60 and between the second component 60 and the third component 110. As stated herein, the benefit of active brazing to join these components is a reduction in the number of process steps and cost, as active brazing is a simpler process than metallization/TCB.

It is important to note that the braze alloy composition introduced between the first component and the second component does not necessarily have to be the same as the braze alloy composition introduced between the second component and the third component. However, if two different braze alloy compositions are used, they must be able to be heated under the same conditions to achieve liquidus without melting the components to be joined.

According to some embodiments of the disclosure, the base metal for the braze alloy is nickel, which is relatively inert in corrosive environments as compared to other known base metals, such as chromium. In some embodiments, the braze alloy composition is based on a nickel-germanium (Ni—Ge) binary alloy. In some embodiments, the braze alloy composition includes nickel, an active metal element and germanium. Germanium is a melting point depressant. In some embodiments, the braze alloy includes germanium in an amount greater than about 5 weight percent, and the active metal element in an amount less than about 10 weight percent. In order to reduce the liquidus temperature, at least one additional melting point depressant, such as silicon, palladium, copper, and/or manganese, or a combination thereof, may further be added. These additional melting point depressants may further decrease the viscosity (increase the wettability) of the braze alloy.

Generally, Ni—Ge binary alloys exhibit good strength, ductility, and good phase stability at high temperatures. The presence of germanium in the braze alloy may influence the liquidus temperature, and phase stability of the alloy. As a eutectic composition, the Ni—Ge binary alloy tends to be brittle. In one embodiment, hypo-eutectic compositions of the Ni—Ge binary alloy may be desirable. Hypo-eutectic compositions of Ni—Ge binary alloys are compositions containing an amount of germanium less than the amount of germanium in the eutectic composition. Controlling the amount of germanium in the braze alloy provides control over the liquidus temperature, thermal expansion coefficient, and phase stability of the alloy. In some embodiments of this invention, a suitable range for the amount of germanium is less than about 50 weight percent, based on the total weight of the braze alloy. In some embodiments, germanium is present from about 10 weight percent to about 50 weight percent, based on the total weight of the braze alloy. In some specific embodiments, germanium is present from about 20 weight percent to about 40 weight percent, based on the total weight of the braze alloy.

The hypo-eutectic compositions of the Ni—Ge alloys usually have a high liquidus temperature based on their composition. In order to reduce the liquidus temperature, additional melting point depressants may be added. Suitable examples of the additional melting point depressant include, but are not limited to, silicon, palladium, boron, copper, manganese, or a combination thereof. These additional melting point depressants may further decrease the viscosity (increase the wettability) of the braze alloy.

A suitable amount of the additional melting point depressant may be less than about 20 weight percent, based on the total weight of the braze alloy (but excluding the amount of germanium). In some embodiments, the braze alloy includes up to about 15 weight percent of the additional depressants. A suitable range is often from about 1 weight percent to about 10 weight percent. In some specific embodiments, the braze alloy includes up to about 10 weight percent palladium, based on the total weight of the braze alloy. In some embodiments, the braze alloy includes up to about 10 weight percent silicon, based on the total weight of the braze alloy. In some embodiments, the braze alloy includes up to about 5 weight percent boron, based on the total weight of the braze alloy. In some embodiments, a small amount of each of silicon or boron (e.g., less than about 5 weight percent) is used, as each of these may react with the active metal element (e.g. titanium) to form high-melting alloys. (All of these ranges are calculated with the exclusion of the germanium level).

In some embodiments, the braze alloy composition includes nickel, an active metal element, and silicon and boron. Addition of an active metal element, especially titanium, could be technically very challenging due to the possibility of titanium boride formation, in that the formation of titanium boride may not allow any titanium to be used as the active element. However, it has been observed that titanium in these alloys is not captured in titanium boride form.

In some embodiments, the braze alloy composition includes nickel, an active metal element, and niobium and chromium. In some embodiments, niobium is present in an amount from about 14 weight percent to about 20 weight percent. In some embodiments, chromium is present in an amount from 2 weight percent to about 28 weight percent. In some embodiments, an alloying element may further be present in the braze alloy to adjust several properties of the braze alloy, such as corrosion resistance, liquidus temperature, brazing temperature, and mechanical properties of the alloy. Examples of suitable alloying elements include cobalt, molybdenum, tungsten, niobium, and tantalum. In some embodiments, the first braze alloy may include up to about 10 weight percent cobalt. Addition of a melting point depressant may reduce the melting point of the overall composition. A suitable range for the amount of palladium is from about 0 weight percent to about 10 weight percent to lower the melting point. One example of the nickel, active metal, niobium/chromium braze alloy composition is Ni-28Cr-14Nb-9Co-5Ti.

In some embodiments, the braze alloy composition further includes iron, chromium, or a combination thereof. In some embodiments, iron is present in an amount less than about 10 weight percent, based on the total weight of the braze alloy. In some embodiments, chromium is present in an amount less than about 10 weight percent, based on the total weight of the braze alloy. Silicon and boron are melting point depressants. Addition of a melting point depressant may reduce the melting point of the overall composition. A suitable range for the amount of silicon is from about 2 weight percent to about 10 weight percent. In some embodiments, a small amount of each of silicon or boron (e.g., less than about 5 weight percent) is desirable, as each of these may react with the active metal element (e.g. titanium) to form high-melting alloys. In some embodiments, an alloying element may further be present in the braze alloy to adjust several properties of the braze alloy, such as corrosion resistance, liquidus temperature, brazing temperature, and mechanical properties of the alloy. Examples of suitable alloying elements include cobalt, molybdenum, tungsten, niobium, and tantalum. In some embodiments, the first braze alloy may include up to about 50 weight percent cobalt. Each of the other alloying elements may be present in an amount up to about 5 weight percent, based on the total weight of the braze alloy. One example of the nickel, active metal, silicon/boron braze alloy composition is Ni-7Cr-4.5Fe-4.5Si-3.2B-2Ti.

According to some embodiments of the disclosure, the base metal for the braze alloy is copper. In some embodiments, the braze alloy composition includes copper, an active metal element, and nickel. Development of this braze alloy is driven from abundant and inexpensive copper in the formulation. In addition, copper is a highly ductile metal, and thus copper based alloys (with high content of copper) can be processed using a wide variety of cost-effective techniques such as rolling, melt spinning and powder atomization. Nickel can function as a chemically-inert element in a corrosive environment, and thus improves the corrosion resistance of the alloy composition. The addition of nickel may also increase the melting temperature of the alloy composition. In some of these embodiments, nickel may be present in an amount less than about 30 weight percent, based on the total weight of this braze alloy. A suitable amount of nickel may range from about 3 weight percent to about 25 weight percent. This braze alloy composition may further include at least one alloying element. The alloying element may provide further adjustments in several required properties of the braze alloy, for example coefficient of thermal expansion, liquidus temperature, brazing temperature, corrosion resistance, and strength of the braze alloy. In one embodiment, the alloying element can include, but is not limited to, chromium, niobium, cobalt, iron, molybdenum, tungsten, palladium, or a combination thereof. In some embodiments, the braze alloy includes up to about 4 weight percent chromium, based on the total weight of the braze alloy. In some embodiments, the braze alloy includes up to about 1 weight percent molybdenum, based on the total weight of the braze alloy. In some embodiments, the braze alloy includes up to about 2 weight percent niobium, based on the total weight of the braze alloy. In some embodiments, the braze alloy may further include palladium. Addition of palladium may improve corrosion resistance of the overall composition. The braze alloy may include up to about 40 weight percent palladium, based on the total weight of the braze alloy. The braze alloy composition provides high resistance to sodium corrosion resistance, and can provide moderate corrosion resistance in a halide-containing environment. Three examples of this copper, active metal, nickel braze alloy are shown below:
(i) Cu-3Ni-1Ti
(ii) Cu-10Ni-2Ti
(iii) Cu-10Pd-15Ni-2Cr-0.5Mo-2Ti.

The presence and the amount of the active metal may influence the thickness and the quality of the thin reactive layer, which contributes to the wettability or flowability of the braze alloy, and therefore, the bond strength of the resulting joint. In some embodiments, the active metal is present in an amount less than about 10 weight percent, based on the total weight of the braze alloy. A suitable range is often from about 0.5 weight percent to about 5 weight percent. In some specific embodiments, the active metal is present in an amount ranging from about 1 weight percent to about 3 weight percent, based on the total weight of the braze alloy. The active metal element is generally present in small amounts suitable for improving the wetting of the ceramic surface, and forming the thin reaction layer, for example, less than about 10 microns. A high amount of the active metal layer may cause or accelerate halide corrosion.

The braze alloy composition may further include at least one alloying element. The alloying element may provide further adjustments in several required properties of the braze alloy, for example coefficient of thermal expansion, liquidus temperature and brazing temperature. In one embodiment, the alloying element can include, but is not limited to, cobalt, iron, chromium, niobium or a combination thereof. In some embodiments, the braze alloy includes up to about 30 weight percent (e.g., about 1%-30%) of the alloying element, based on the total weight of the braze alloy. In some specific embodiments, the braze alloy includes up to about 10 weight percent chromium, based on the total weight of the braze alloy. In other specific embodiments, the braze alloy includes up to about 10 weight percent niobium, based on the total weight of the braze alloy. In some embodiments, the braze alloy includes up to about 20 weight percent of iron, based on the total weight of the braze alloy. In some specific embodiments, the braze alloy includes up to about 30 weight percent of cobalt, based on the total weight of the braze alloy.

The braze alloy composition consists of an element (for example, titanium), which has higher free energy of formation for oxides compared to aluminum. In some embodiments, this braze alloy composition is used as a foil (or paste) between beta-alumina and a ceramic insulator, and/or between metal or a metal alloy and a ceramic insulator. This assembly is heated in dry argon to a temperature higher than the liquidus temperature of the alloy. Without being held to any one theory, it is believed that the active element (for example, Ti) reacts with the ceramic insulator, such as alpha-alumina, and/or beta-alumina to form titanium suboxides on the interface, which results in cohesive bonding between two components.

Figure 2A:
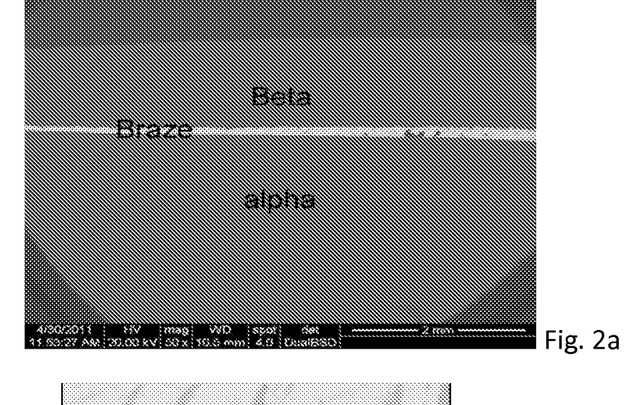
FIG. 2 shows SEM pictures of an alpha-alumina to beta-alumina joint.
Figure 2B:
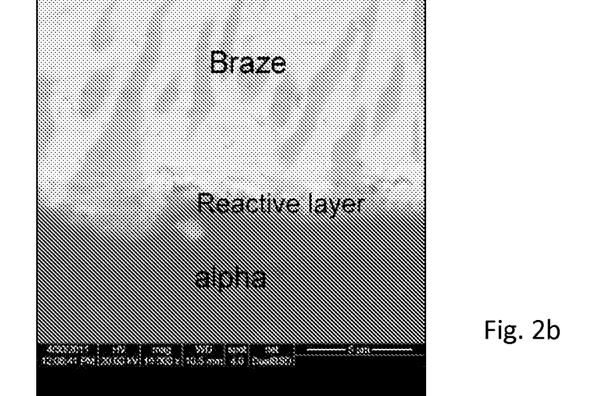
Figure 2C:
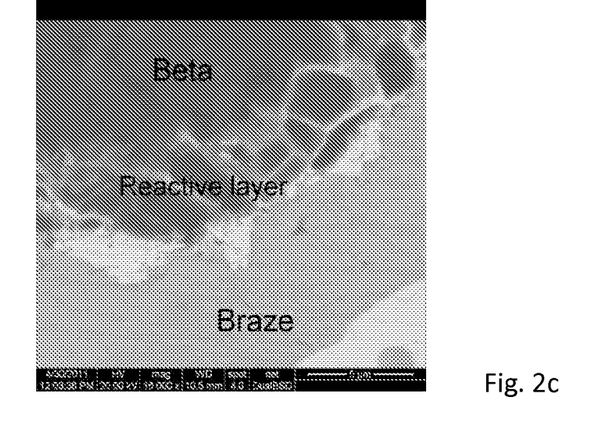

In one embodiment, a beta-alumina component is joined with an alpha-alumina component by using a foil of cusil (63Ag-35.35Cu-1.75Ti) active braze alloy. The components with the active braze alloy were heated to brazing temperature (35° C. above the liquidus of the alloy) in argon gas and then cooled. In this example, the components were heated to 1000° C. for 10 min in argon. FIG. 2 demonstrates that alpha-alumina was joined successfully to beta-alumina in these brazing conditions. FIG. 2(a) shows the entire alpha-alumina to braze to beta-alumina joint, while FIG. 2(b) and FIG. 2(c) show closer views of the alpha-alumina to braze joint and the braze to beta-alumina joint, respectively.

In some embodiments, a layer of the braze alloy is disposed on at least one surface of either or both of the components to be joined by brazing. The thickness of the alloy layer may be in a range between about 5 microns to about 100 microns. In some specific embodiments, the thickness of the layer ranges from about 10 microns to about 50 microns. The layer may be deposited or applied on one or both the surfaces to be joined, by any suitable technique, e.g. by a printing process or other dispensing processes. In some instances, the foil, wire, or the preform may be suitably positioned for bonding the surfaces to be joined.

The method further includes step of heating the brazing structure at the brazing temperature. When the brazing structure is heated at the brazing temperature, the braze alloy melts and flows over the surfaces. To achieve good flow and wetting of the braze alloy, the brazing structure is held at the brazing temperature for a few minutes after melting of the braze alloy, and this period may be referred to as "brazing time".

The brazing temperature and the brazing time may influence the quality of the active braze seal. The brazing temperature is generally less than the melting temperatures of the components to be joined, and higher than the liquidus temperature of the braze alloy. In one embodiment, the brazing temperature is below about 1500 degrees Celsius. In one embodiment, the brazing temperature ranges from about 900 degrees Celsius to about 1500 degrees Celsius for a time of about 1 minute to about 30 minutes. In a specific embodiment, the heating is carried out at a brazing temperature from about 1000 degrees Celsius to about 1300 degrees Celsius for about 5 minutes to about 15 minutes. In one embodiment, the brazing temperature is held constant in a range of about 1050 to about 1100 degrees Celsius for about 15 minutes, then is held constant at a temperature in a range of about 1150 to about 1250 degrees Celsius for about 15 minutes. The expression "from about X degrees Celsius to about Y degrees Celsius" means that the process is carried out either by maintaining any temperature between X° C. and Y° C. or by varying the temperature within that range. To be perfectly clear, the expression "from about 900 degrees Celsius to about 1500 degrees Celsius" means that the process is carried out either by maintaining any temperature between 900° C. and 1500° C. or by varying the temperature within that range.

As discussed above, the braze alloy has a liquidus temperature lower than the melting temperatures of the components to be joined. In one embodiment, the braze alloy has a liquidus temperature of at least about 850 degrees Celsius. In one embodiment, the braze alloy has a liquidus temperature from about 850 degrees Celsius to about 1300 degrees Celsius, and in some specific embodiments, from about 950 degrees Celsius to about 1250 degrees Celsius.

The active braze alloy composition used will contribute to the parameters for heating. Clearly the parameters must be such that the components themselves are not damaged, but the heating will have to be such that liquidus is achieved. In most embodiments, the heating comprises holding the brazing temperature constant for about 1 minute to about 30 minutes after the braze alloy composition becomes substantially liquid. The heating temperature used, as well as the total heating time and the temperature ramp-up characteristics, depends on the braze alloy composition being used.

Figure 3:
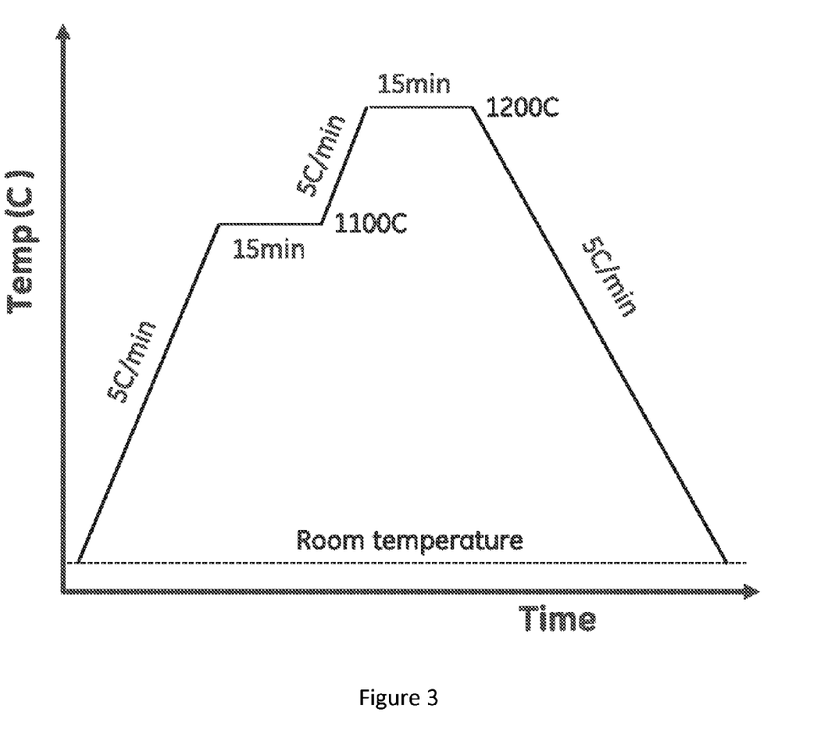
FIG. 3 shows a heating profile for a specific braze alloy composition.

As described above, one example of a braze alloy that may be used in embodiments herein is an alloy of nickel-germanium-active metal. One representative heating profile for this alloy is shown in FIG. 3. As is shown here, the temperature is ramped at a ramp rate of 5C/min to 1100° C. and held for 15 minutes. The temperature is again ramped at a ramp rate of 5C/min to 1200° C. and held for 15 minutes. The furnace is then cooled at 5C/min to room temperature. During the heating and cooling, the furnace is in controlled atmosphere of dry argon or 1-5% $H_2$ (balance by argon) or dry helium.

The heating may be carried out in a number of different atmospheres. The heating can be undertaken in a controlled atmosphere, such as argon, hydrogen, nitrogen, helium; or in a vacuum. In most embodiments of the invention, the heating is performed in an ultra high pure argon atmosphere (that is, 99.99998%), dry helium, an atmosphere of 1%-5% hydrogen (balanced by argon), or a vacuum.

During brazing, the active metal element (or elements) present in the melt decomposes and forms a thin reactive layer at the interface of the ceramic surface and the braze alloy, as described previously. The thickness of the reactive layer may range from about 0.1 micron to about 2 microns, depending on the amount of the active metal element available to react with the component, the surface properties of the component, brazing temperature and brazing time. The brazing structure is then subsequently cooled to room temperature; with a resulting, active braze seal between the two components. In some instances, rapid cooling of the brazing structure is permitted.

The examples described previously herein are intended to be merely illustrative and should not be construed to be any sort of limitation on the scope of the claimed invention. Unless specified otherwise, all of the components are commercially available from common chemical suppliers.

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed is:

1. A method of sealing a portion of beta-alumina electrolyte, insulated collar and metal rings of a sodium-based thermal battery, comprising:
   a) introducing a braze alloy composition between a first component and a second component to be joined, wherein the first component is comprised of beta-alumina and the second component is comprised of a ceramic insulator;

b) introducing the braze alloy composition between the second component and a third component to be joined, wherein the third component is comprised of metal or metal alloy; and c) heating the components to form an active braze seal (joint) between the first component and the second component and between the second component and the third component.

2. The method according to claim 1, wherein said ceramic insulator is selected from alpha-alumina, spinel, zirconia and yttria, and combinations thereof.

3. The method according to claim 2, wherein said ceramic insulator is alpha-alumina.

4. The method according to claim 1, wherein said braze alloy composition comprises nickel and an active metal element, and further comprises a) germanium, b) niobium and chromium, or c) silicon and boron; or wherein said braze alloy composition comprises copper, nickel and an active metal element.

5. The method according to claim 1, wherein the heating is carried out at a brazing temperature, wherein said brazing temperature is equal to or greater than the liquidus temperature of the braze alloy composition and less than the melting temperatures of the components to be joined.

6. The method according to claim 4, wherein the heating is carried out at a brazing temperature, wherein said brazing temperature is equal to or greater than the liquidus temperature of the braze alloy composition and less than the melting temperatures of the components to be joined.

7. The method according to claim 6, wherein the heating comprises holding the brazing temperature constant for about 1 minute to about 30 minutes after the braze alloy becomes substantially liquid.

8. The method according to claim 7, wherein the heating comprises holding the brazing temperature constant in a range of about 1050 to about 1100 degrees Celsius for about 15 minutes, then holding the brazing temperature constant at a temperature in a range of about 1150 to about 1250 degrees Celsius for about 15 minutes.

9. The method according to claim 1, wherein the heating is carried out in an ultra high pure argon atmosphere or 1%-5% hydrogen (balanced by argon) or ultra high pure helium or vacuum.

10. The method according to claim 1, wherein the third component comprises nickel or a nickel based alloy.

11. The method according to claim 4, wherein the active metal element is selected from titanium, zirconium, hafnium, vanadium, and combinations thereof.

12. The method according to claim 11, wherein the active metal element is titanium.

13. A method of joining a ceramic insulator and beta-alumina by active brazing, comprising:

a) introducing a braze alloy composition between the ceramic insulator and the beta-alumina to be joined; and b) heating the components to form an active braze seal (joint) between the ceramic insulator and the beta-alumina;

wherein said braze alloy composition comprises nickel and an active metal element, and further comprises a) germanium, b) niobium and chromium, or c) silicon and boron; or wherein said braze alloy composition comprises copper, nickel and an active metal element; and wherein the heating step is carried out at a brazing temperature that is equal to or greater than the liquidus temperature of the braze alloy composition; and less than the melting temperatures of the components to be joined; comprising the step of holding the brazing temperature constant in a range of about 1050 to about 1100 degrees Celsius for about 15 minutes, then holding the brazing temperature constant at a temperature in a range of about 1150 to about 1250 degrees Celsius for about 15 minutes.

14. The method according to claim 13, wherein said ceramic insulator is selected from alpha-alumina, spinel, zirconia and yttria, and combinations thereof.

15. The method according to claim 14, wherein said ceramic insulator is alpha-alumina.

16. The method according to claim 13, wherein the heating is carried out in an ultra high pure argon atmosphere, or 1%-5% hydrogen (balanced by argon) or ultra high pure helium or vacuum.

17. The method according to claim 13, wherein the active metal element is selected from titanium, zirconium, hafnium, vanadium, and combinations thereof.

18. The method according to claim 17, wherein the active metal element is titanium.

19. The method according to claim 1, wherein the sodium-based thermal battery is a sodium metal halide battery.

* * * * *